(12) United States Patent
Pauls (10) Patent No.: US 10,144,314 B2
(45) Date of Patent: Dec. 4, 2018

(54) VEHICLE SEAT FRAME WITH DETENT FITTINGS WHICH ARE COUPLED TOGETHER

(71) Applicant: Brose Fahrzeugteile GmbH & Co. Kommanditgesellschaft, Coburg, Coburg (DE)

(72) Inventor: Andreas Pauls, Grub am Forst (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 15/506,666

(22) PCT Filed: Aug. 19, 2015

(86) PCT No.: PCT/EP2015/068994
§ 371 (c)(1),
(2) Date: Feb. 24, 2017

(87) PCT Pub. No.: WO2016/030238
PCT Pub. Date: Mar. 3, 2016

(65) Prior Publication Data
US 2017/0274799 A1 Sep. 28, 2017

(30) Foreign Application Priority Data
Aug. 26, 2014 (DE) ........................ 10 2014 216 948

(51) Int. Cl.
*B60N 2/20* (2006.01)
*B60N 2/22* (2006.01)
(Continued)

(52) U.S. Cl.
CPC ......... *B60N 2/2356* (2013.01); *B60N 2/0296* (2013.01); *B60N 2/236* (2015.04); *B60N 2205/50* (2013.01)

(58) Field of Classification Search
CPC .... B60N 2/2356; B60N 2/236; B60N 2/0296; B60N 2205/50
(Continued)

(56) References Cited

U.S. PATENT DOCUMENTS

| 4,913,494 A * | 4/1990 | Ikegaya | ............... B60N 2/2352 |
| | | | 297/354.12 |
| 5,927,809 A * | 7/1999 | Tame | ..................... B60N 2/123 |
| | | | 297/378.12 X |

(Continued)

FOREIGN PATENT DOCUMENTS

DE 10-2008-061-147 A1 6/2010
DE 10-2009-022-777 A1 11/2010
(Continued)

*Primary Examiner* — Rodney B White
(74) *Attorney, Agent, or Firm* — Lewis Roca Rothgerber Christie LLP (57) ABSTRACT

A vehicle seat frame comprising a first adjusting part and a second adjusting part which is pivotable relative to the first adjusting part, at least two detent fittings by means of which the first adjusting part and the second adjusting part are connected together, wherein the at least two detent fittings hold the two adjusting parts in position relative to each other in a locked state and are able to be unlocked from each other in order to pivot the two adjusting parts, an actuating device which is connected to a first of the at least two detent fittings for unlocking the first of the at least two detent fittings and a coupling device by means of which the at least two detent fittings are coupled together for a common unlocking process. The coupling device comprises a tensile element which is designed to transmit a tensile force.

13 Claims, 5 Drawing Sheets

(51) Int. Cl.
  *B60N 2/235* (2006.01)
  *B60N 2/36* (2006.01)
  *B60N 2/02* (2006.01)

(58) Field of Classification Search
  USPC ................ 297/366–377, 378.12, 378.14
  See application file for complete search history.

(56) References Cited

U.S. PATENT DOCUMENTS

| | | | | |
|---|---|---|---|---|
| 6,152,533 | A * | 11/2000 | Smuk | B60N 2/12 |
| | | | | 297/378.12 X |
| 6,158,800 | A * | 12/2000 | Tsuge | B60N 2/206 |
| | | | | 297/378.12 X |
| 6,336,679 | B1 * | 1/2002 | Smuk | B60N 2/0705 |
| | | | | 297/378.12 X |
| 6,543,598 | B1 * | 4/2003 | Schumann | B60N 2/08 |
| | | | | 192/15 |
| 6,619,744 | B2 * | 9/2003 | Reubeuze | B60N 2/2358 |
| | | | | 297/367 R |
| 6,848,745 | B1 * | 2/2005 | Tsuge | B60N 2/2362 |
| | | | | 297/367 R |
| 6,860,562 | B2 * | 3/2005 | Bonk | B60N 2/01583 |
| | | | | 297/378.12 X |
| 6,926,364 | B2 * | 8/2005 | Cooley | B60N 2/12 |
| | | | | 297/378.12 X |
| 7,517,022 | B2 * | 4/2009 | Habedank | B60N 2/06 |
| | | | | 297/378.12 X |
| 9,308,835 | B2 * | 4/2016 | Schukalski | B60N 2/20 |
| 2001/0028189 | A1 * | 10/2001 | Klein | B60N 2/20 |
| | | | | 297/378.12 |
| 2005/0062329 | A1 * | 3/2005 | Alacqua | B60N 2/20 |
| | | | | 297/378.12 |
| 2009/0026791 | A1 * | 1/2009 | Ishijima | B60N 2/0296 |
| | | | | 297/361.1 X |
| 2013/0187423 | A1 | 7/2013 | Pleskot | |
| 2013/0193733 | A1 | 8/2013 | Pleskot | |
| 2013/0278031 | A1 | 10/2013 | Kostin et al. | |
| 2014/0028070 | A1 | 1/2014 | Pleskot | |

FOREIGN PATENT DOCUMENTS

| | | |
|---|---|---|
| DE | 10-2009-035-229 A1 | 2/2011 |
| DE | 10-2010-063-972 A1 | 6/2012 |
| DE | 10-2012-001-276 A1 | 7/2013 |
| DE | 10-2012-001-281 A1 | 7/2013 |
| DE | 10-2012-014-897 A1 | 7/2013 |
| DE | 10-2012-218-139 A1 | 4/2014 |
| EP | 2 376 308 B1 | 10/2011 |
| EP | 2 674 322 A1 | 12/2013 |
| JP | 3-39442 | 4/1991 |
| WO | WO 2010/051646 A1 | 5/2010 |
| WO | WO 2010/133201 A1 | 11/2010 |
| WO | WO 2014/053260 A1 | 4/2014 |

* cited by examiner

VEHICLE SEAT FRAME WITH DETENT FITTINGS WHICH ARE COUPLED TOGETHER

CROSS-REFERENCE TO A RELATED APPLICATION(S)

This application is a National Phase Patent Application of International Patent Application Number PCT/EP2015/068994, filed on Aug. 19, 2015, which claims priority of German Patent Application Number 10 2014 216 948.8, filed on Aug. 26, 2014. The contents of both of which are incorporated herein by reference.

BACKGROUND

The invention relates to a vehicle seat frame.

Such a vehicle seat frame comprises a first adjusting part and a second adjusting part which is pivotable relative to the first adjusting part. The first adjusting part may be configured, for example, as a seat frame of the vehicle seat frame, whilst the second adjusting part may be implemented, for example, by a backrest frame which is pivotable relative to the seat frame. The first adjusting part and the second adjusting part are connected together by means of at least two detent fittings which hold the adjusting parts in position relative to each other in a locked state and are able to be unlocked from each other in order to pivot the two adjusting parts.

For example, in a front seat in a vehicle generally two detent fittings are provided which are arranged on both sides of the vehicle seat—namely, on the one hand, on a so-called door side and, on the other hand, on a tunnel side facing toward the center of the vehicle. However, in the case of a rear seat bench of a vehicle, for example, more than two detent fittings, for example three or four detent fittings, may also be provided.

The vehicle seat frame further comprises an actuating device which is connected to a first of the at least two detent fittings for unlocking the first of the at least two detent fittings and a coupling device, by means of which the at least two detent fittings are coupled together for a common unlocking process.

Such detent fittings are disclosed, for example, in DE 10 2009 022 777 A1 and DE 10 2008 061 147 A1, the contents thereof being intended to be incorporated fully in the present invention. In the detent fittings described therein, in a locked state, locking bars which are displaceably guided on a first fitting part engage in a locking manner in a toothing of a second fitting part, so that in the locked state the fitting parts are not able to be pivoted relative to one another. The locking bars may be moved from their locked position into an unlocked position where they are not in engagement (any longer) with the toothing of the second fitting part so that the fitting parts may be pivoted relative to one another and, for example, a backrest may be adjusted relative to a seat part.

In conventional fitting arrangements an actuating shaft which extends between the fittings and which serves for the common actuation of the fittings is provided for coupling two fittings. The actuating shaft in detent fittings known from the prior art is engaged in a positive locking manner with a control cam of each fitting so that when rotating the actuating shaft the control cams are actuated and the locking bars are moved thereby for the unlocking process.

Such an actuating shaft requires constructional space on a vehicle seat frame. Thus in the conventional manner the actuating shaft extends between the detent fittings to be coupled on both sides of the vehicle seat. Insufficient constructional space is available inside the vehicle seat and thus an installation of such an actuating shaft may potentially be difficult.

SUMMARY

It is an object of the present invention to provide a vehicle seat frame with detent fittings arranged thereon, in which the detent fittings may be coupled together in a simple, reliable and space-saving manner.

This object is achieved by a vehicle seat frame with features as described herein.

Accordingly, it is provided that the coupling device comprises a tensile element which is designed to transmit a tensile force and which is designed to transmit a tensile force from the first of the at least two detent fittings to the second of the at least two detent fittings in order to unlock the second of the at least two detent fittings when actuating the actuating device in order to unlock the first of the at least two detent fittings.

The present invention is based on the idea of providing a tensile element instead of an actuating shaft for the rigid coupling of the detent fittings together, said tensile element serving for transmitting tensile forces. Such a tensile element may be configured, for example, as an element designed as a tensile cable, as a band, belt or strap, as a chain or the like for transmitting tensile forces.

The tensile element serves to transmit a tensile force from the one first detent fitting to the other second detent fitting, when actuating the actuating device, in order to actuate the detent fittings together and to effect a common unlocking process. In this case the actuating device is arranged on the first of the detent fittings and effects a (direct) actuation of the first detent fitting. Due to the coupling via the tensile element, this actuation of the first detent fitting also leads to an actuation of the second detent fitting so that the detent fittings may be unlocked together and the adjusting parts may be pivoted relative to one another.

The tensile element may be guided, for example, on a guide device. The tensile element thus extends in a guided manner, for example, on the second adjusting part. For example, the tensile element may be guided in the form of a tensile cable in a Bowden tube, wherein the Bowden tube is supported relative to the second adjusting part via a Bowden tube support.

The tensile element acts, on the one hand, on the first detent fitting and, on the other hand, on the second detent fitting. When actuating the first detent fitting a tensile force acts on the tensile element, said tensile force being transmitted to the second detent fitting and also leading to an actuation of the second detent fitting. In order to couple the tensile element to the detent fittings, the detent fittings in each case may comprise, for example, a coupling element, the tensile element acting thereon and said coupling element being rotatable for the unlocking process.

The coupling element may be arranged, for example, fixedly in terms of rotation on an actuating shaft of the respectively assigned detent fitting, wherein for actuating the detent fitting the actuating shaft is rotated together with the coupling element arranged thereon. On the part of the first detent fitting, the actuating shaft may be operatively connected to the actuating device, for example, so that when actuating the actuating device the actuating shaft of the first detent fitting is rotated. Due to the coupling of the actuating shaft via the coupling element to the tensile element, a tensile force is then transmitted via the coupling element and the actuating shaft of the second detent fitting to the second detent fitting and also leads to an actuation of the second detent fitting.

The coupling element may be configured, for example, as a coupling wheel which is rotatable about the rotational axis. The coupling wheel comprises a circumferential surface extending around the rotational axis in a circumferential manner, the tensile element being guided thereon, by the tensile element, for example, being located in a guide groove configured on the circumferential surface.

The coupling device, the component thereof being the tensile element, may for example provide a 1:1 ratio. An actuating movement on the first detent fitting is thus transmitted at a ratio of 1:1 to the second detent fitting. An actuation path on the first detent fitting, therefore, results in the same actuation path on the second detent fitting.

It is also conceivable and possible, however, that the coupling device has a step-up or step-down gearing, by an actuation path on the first detent fitting being transmitted to the second detent fitting in a step-up or step-down manner. This may serve to compensate for any tolerances in order to adapt the detent fittings to one another for synchronous unlocking.

For example, for providing such a step-up or step-down gearing the coupling wheels of the detent fittings may be configured with different diameters. The tensile element guided on the outer circumference of the coupling wheels thus rolls on different diameters so that a rotational movement of the coupling wheel of the first detent fitting is transmitted in a step-up or step-down manner into a rotational movement of the coupling wheel of the second detent fitting. In particular, this may have the result that an adjusting angle of the coupling wheel of the first detent fitting and the coupling wheel of the second detent fitting differ from one another.

The coupling elements of the detent fittings serve to transmit a tensile force from the first detent fitting to the second detent fitting. For the unlocking process, in this case, the coupling element is rotated on the part of the first detent fitting which results in the tensile element being wound to a certain extent onto the coupling element of the first detent fitting. The tensile element is thus displaced and rotates the coupling element of the second detent fitting, whereby the tensile element is wound to a certain extent off the coupling element of the second detent fitting.

In a practical embodiment, the coupling elements of the detent fittings remain fixed in position relative to the first adjusting part, during a pivoting of the second adjusting part, for example a backrest frame, relative to the first adjusting part, for example a seat frame. The coupling elements thus do not move with the second adjusting part during a pivoting of the second adjusting part but maintain their position relative to the first adjusting part.

If the tensile element is supported via a suitable guide device, for example a Bowden tube, on the second adjusting part, a pivoting of the second adjusting part (for example of the backrest frame) relative to the first adjusting part (for example the seat frame) has the result that the position of the tensile element changes relative to the coupling elements. In order to prevent a pivoting of the second adjusting part being able to influence the actuation of the detent fittings, for example, it may be provided that when pivoting the second adjusting part relative to the first adjusting part, the tensile element is wound onto the coupling element of a detent fitting and is wound off the coupling element of the other detent fitting. When pivoting the second adjusting part, therefore, this results in a change in the position of the tensile element relative to the coupling elements but not to an actuation, since the length of the tensile element extending between the coupling elements remains unchanged. The tensile element is instead displaced on the second adjusting part without a force being exerted on one of the detent fittings.

The actuating device may be configured, for example, as a lever kinematic system. Thus, for example, an actuating lever may be pivotably arranged on the seat frame, said actuating lever being able to be pivoted for actuating the detent fittings. Via one or more further levers the actuating lever may be coupled to the actuating shaft of the first detent fitting so that when pivoting the actuating lever the actuating shaft of the first detent fitting is rotated. As a result, on the one hand, the first detent fitting is actuated for the unlocking and, on the other hand,—due to the coupling via the tensile element—the second detent fitting is also unlocked, by a tensile force being transmitted via the tensile element to the second detent fitting.

The detent fittings may, for example, be designed as in DE 10 2009 022 777 A1 or DE 10 2008 061 147 A1 as mentioned above. Thus the at least two detent fittings, for example, in each case may have a first fitting part connected to the first adjusting part and a second fitting part connected to the second adjusting part, rotatably mounted on the first fitting part. The first fitting part has one or more bar elements which are displaceably mounted on the first fitting part radially to the rotational axis and in a locked position are in engagement in a locking manner with a toothing of the second fitting part. For the unlocking process, the bar elements may be displaced on the first fitting part so that the bar elements come out of engagement with the toothing of the second fitting part and the two fitting parts may be rotated, therefore, relative to one another. For the actuation, the detent fitting may comprise, for example, a control cam which is operatively connected to the bar elements and is connected to the actuating shaft of the detent fitting. By rotating the control cam, the bar elements are radially displaced on the first fitting part and, as a result, brought out of engagement with the toothing of the second fitting part for unlocking the detent fitting.

BRIEF DESCRIPTION OF THE DRAWINGS

The idea underlying the invention is intended to be described in more detail hereinafter with reference to the drawings shown in the exemplary embodiments.

DETAILED DESCRIPTION

Figure 1:
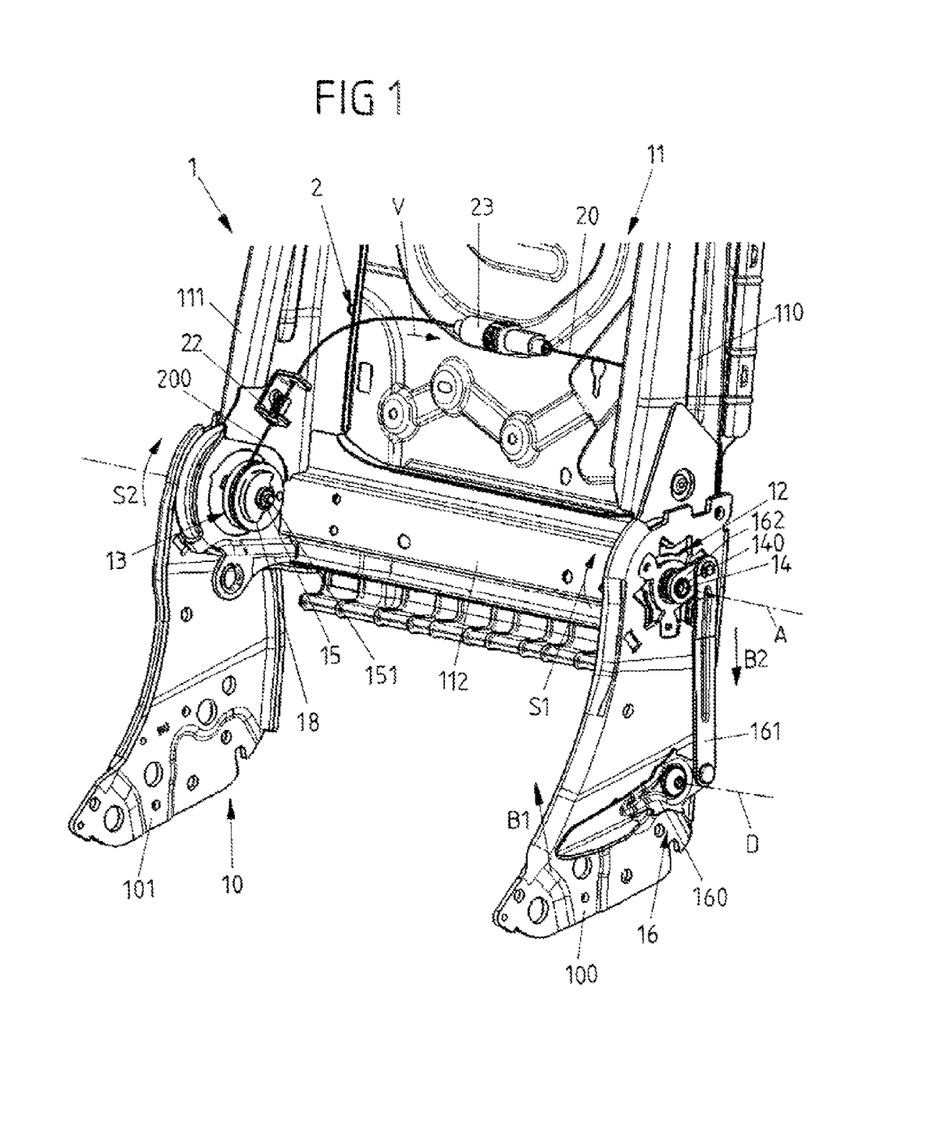
FIG. 1 shows a view of an exemplary embodiment of a vehicle seat frame with a backrest frame which is coupled to a seat frame via two detent fittings.

FIG. 1 shows an exemplary embodiment of a vehicle seat frame 1 which comprises a seat frame 10 and a backrest frame 11 pivotably connected via detent fittings 12, 13 to the seat frame 10.

The detent fittings 12, 13 are connected, on the one hand, to frame parts 100, 101 of the seat frame 10 and, on the other hand, to frame parts 110, 111 of the backrest frame 11. The frame parts 100, 101 are components of the seat frame 10 and are connected to further frame parts of the seat frame 10 (not shown in FIG. 1). Accordingly, the frame parts 110, 111 are connected together via a transverse part 112 and form the backrest frame 11.

Figure 6:
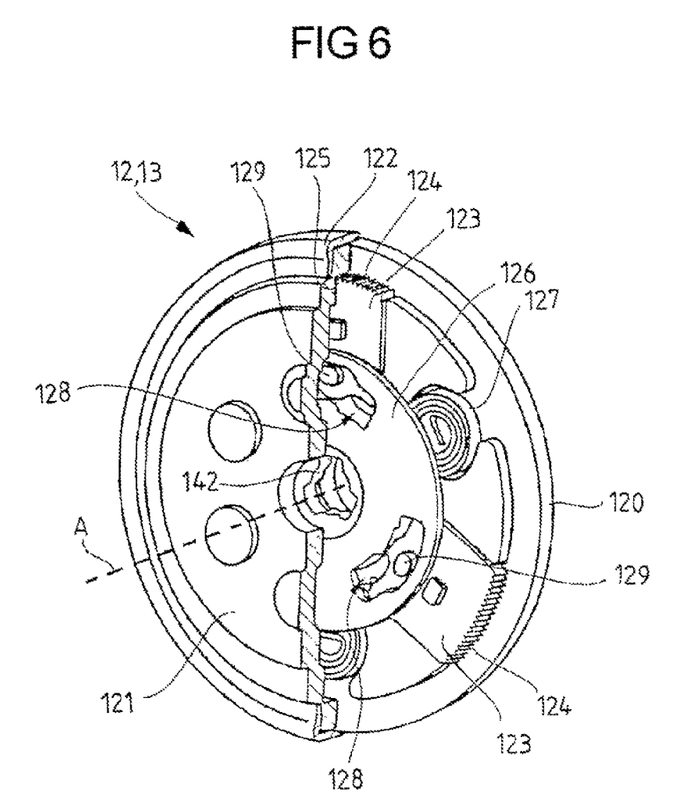
FIG. 6 shows a specific view of an exemplary embodiment of a detent fitting.

In one practical embodiment, the detent fittings 12, 13 may be configured, for example, as shown in FIG. 6. The detent fittings 12, 13 have in each case a first fitting part 120 connected fixedly in terms of rotation to one of the frame parts 100, 101 of the seat frame 10 and a second fitting part 121 connected fixedly in terms of rotation to one of the frame parts 110, 111 of the backrest frame 11, said fitting parts being pivotably mounted on one another via a retaining ring 122. Three locking bars 123 are radially displaceably arranged on the first fitting part 120, wherein the locking bars 123 have an outer toothing 124 which is configured to come into engagement with an internal toothing 125 on the second fitting part 121 in a locked state of the detent fitting 12, 13.

For the actuation, each detent fitting 12, 13 comprises a control cam 126 with a cam disk which is arranged on the rear face thereof and which cooperates via slotted guides 128 with lugs 129 on the bar elements 123 and which, when the control cam 126 is rotated, displaces the bar elements 123 into a radial internal position and as a result unlocks the detent fitting 12, 13.

The control cam 126 with the cam disk arranged on the rear face thereof is pretensioned via springs 127 in the direction of the locked state, so that after actuating the detent fitting 12, 13 and stopping the actuation the control cam 126 is urged into its locked initial state and, via the cam disk arranged on the rear face on the control cam 126, displaces the bar elements 123 again radially outwardly and as a result locks the detent fitting 12, 13.

In the locked state of the detent fittings 12, 13 the detent fittings 12, 13 retain the backrest frame 11 in position relative to the seat frame 10. In order to pivot the backrest frame 11 about a rotational axis A predetermined by the detent fittings 12, 13, relative to the seat frame 10, the detent fittings 12, 13 may be unlocked, by the locking bars 123 of the detent fittings 12, 13 being brought out of engagement with the internal toothing 125 of the second fitting part 121 of the respective detent fitting 12, 13 and, as a result, the fitting parts 120, 121 of the detent fittings 12, 13 may be pivoted relative to one another about the rotational axis A.

In order to actuate the detent fittings 12, 13 on one side of the vehicle seat frame 1, namely on the frame part 100 of the seat frame 10, an actuating device 16 is provided in the form of a lever kinematic system. The actuating device 16 has an actuating lever 160 which is pivotably mounted about a pivot axis D on the frame part 100 and via a lever 161 is coupled fixedly in terms of rotation to an actuating shaft 14 of the (first) detent fitting 12. The actuating shaft 14 penetrates a recess 142 of the control cam 126 of the first detent fitting 12 and is connected on its outer end 140 remote from the other second detent fitting 13 fixedly in terms of rotation to the pivoting lever 162 and thereby coupled to the actuating device 16.

For unlocking the first detent fitting 12, the actuating lever 160 of the actuating device 16 may be pulled upwardly in an actuating direction B1, whereby the lever 161 is displaced downwardly in an actuating direction B2 and as a result the actuating shaft 14 is pivoted in a pivoting direction S1 about the rotational axis A. By the positive locking engagement in the recess 142 of the control cam 126, when the actuating shaft 14 is pivoted, the control cam 126 of the first detent fitting 12 is entrained so that in this manner the locking bars 123 are pulled radially inwardly and thus out of engagement with the internal toothing 125 of the second fitting part 121.

In order to effect a synchronous common actuation of the detent fittings 12, 13, the detent fittings 12, 13 are coupled together via a coupling device 2. The coupling device 2 in the exemplary embodiment shown is designed as a cable pull 20 with a tensile element 200 in the form of a tensile cable which is partially guided in a Bowden tube 201.

The cable pull 20 acts with the tensile element 200 on coupling elements in the form of coupling wheels 17, 18 of the detent fittings 12, 13. Thus, as shown in the enlarged view according to FIG. 2, the first detent fitting 12 has a coupling wheel 17 which is arranged fixedly in terms of rotation on an end 141 of the actuating shaft 14 remote from the end 140 on the inside of the detent fitting 12 and on an outer circumferential surface has a nipple chamber 171, the tensile element 200 engaging therein in a positive locking manner via a suitable cable nipple. On the outer circumferential surface a guide groove 170 is integrally formed in the coupling wheel 17, the tensile element 200 being located therein and the tensile element 200 being guided therein on the coupling wheel 17.

Figure 3A:
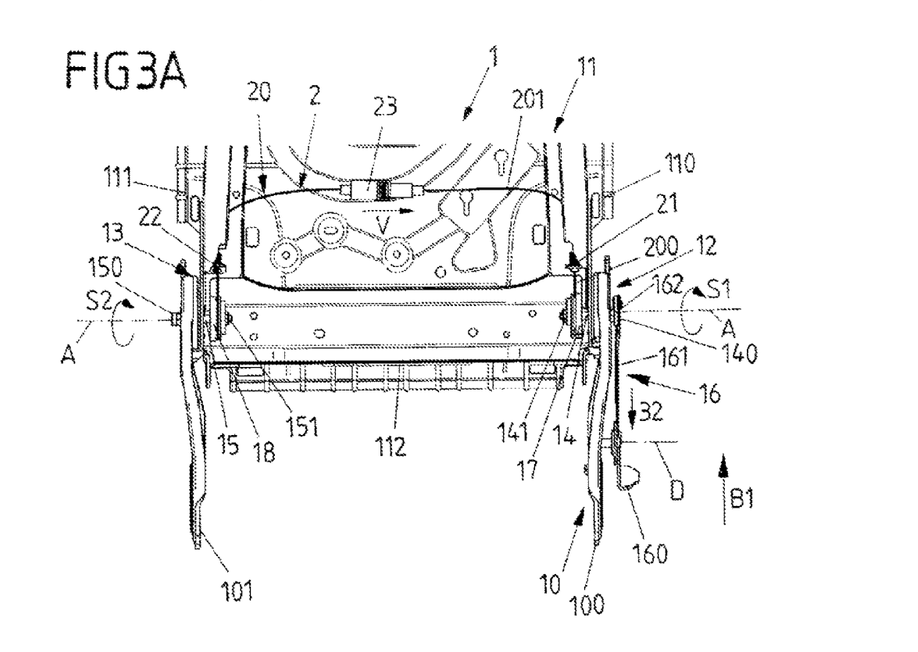
FIG. 3A shows a front view of the vehicle seat frame.
Figure 3B:
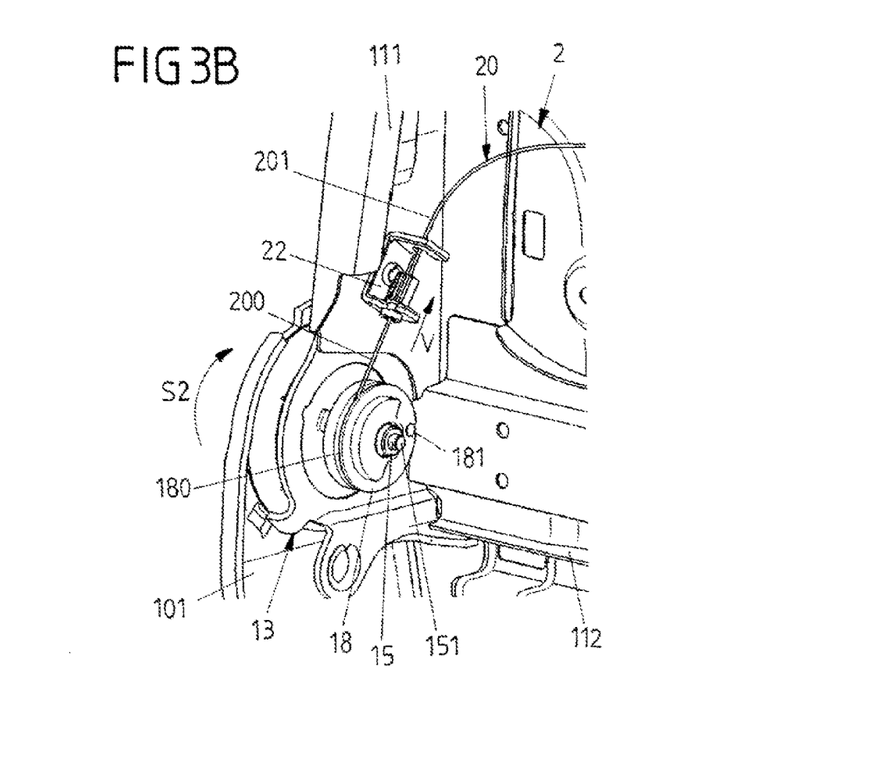
FIG. 3B shows an enlarged view of a second detent fitting on the other side of the vehicle seat frame.

As visible from the enlarged view according to FIG. 3B, in a similar manner the opposing second detent fitting has a coupling element in the form of a coupling wheel 18 which is arranged fixedly in terms of rotation on one end 151 of an actuating shaft 15 of the second detent fitting 13 and is connected in a positive locking manner to the tensile element 200 in the form of the tensile cable via a central chamber 181. In the same manner as the coupling wheel 17 of the first detent fitting 12, the coupling wheel 18 of the second detent fitting 13 on its outer circumferential surface bears a guide groove 180, the tensile element 200 being guided therein.

The actuating shaft 15 passes through the recess 142 of the control cam 126 of the second detent fitting 13 (see FIG. 6) and serves for actuating the second detent fitting 13. The actuating shaft 15 protrudes on the outer face from the detent fitting 13 with one end 150 remote from the end 151 (see for example FIG. 3A).

The cable pull 20 extends between the coupling wheels 17, 18 of the detent fittings 12, 13. The tensile element 200 in the form of the tensile cable in this case is guided between Bowden supports 21, 22 through a Bowden tube 201 which is supported via the Bowden supports 21, 22 relative to the backrest frame 11, wherein a length compensation device 23 for adjusting the length of the Bowden tube 201 relative to the tensile element 200 is arranged approximately centrally on the cable pull 20.

Figure 2:
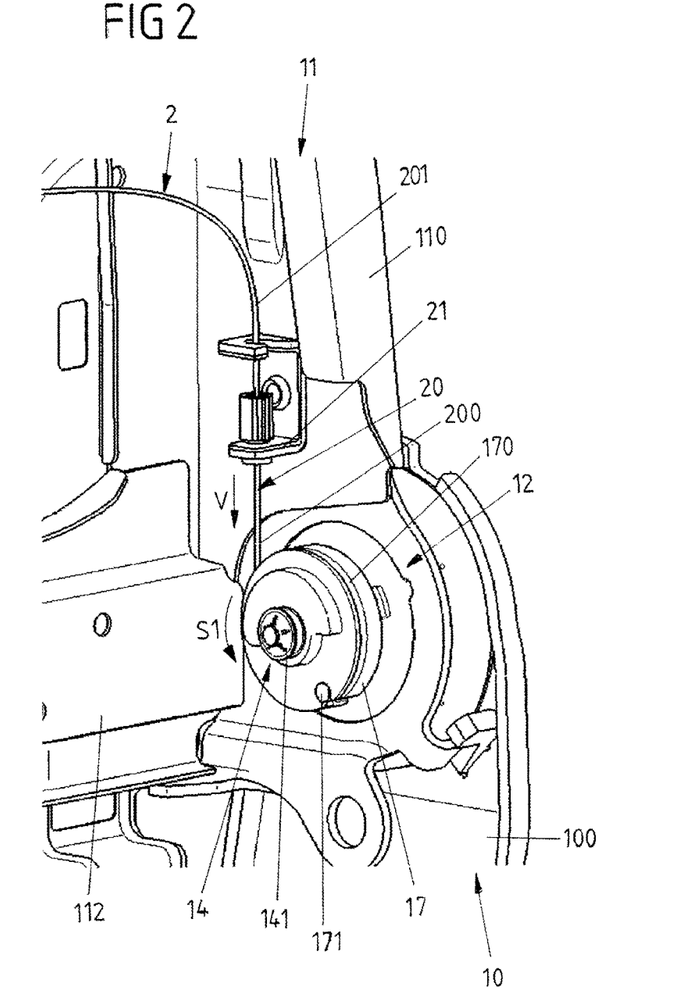
FIG. 2 shows an enlarged view of a first detent fitting on one side of the vehicle seat frame.

When actuating the first detent fitting 12 via the actuating device 16 the actuating shaft 14 is rotated in the rotational direction S1, as shown in FIG. 2, and entrains the coupling wheel 17 in the rotational direction S1. As a result the tensile element 200 coupled to the coupling wheel 17 is entrained in the rotational direction S1 and wound onto the coupling wheel 17 over a travel path, so that the tensile element 200 is displaced in a displacement direction V relative to the Bowden support 201.

As shown in FIGS. 3A and 3B, in this manner a tensile force is effected on the coupling wheel 18 of the second detent fitting 13, which leads to a rotation of the coupling wheel 18 and thus the actuating shaft 15 of the second detent fitting 13 connected fixedly in terms of rotation to the coupling wheel 18, in a rotational direction S2 aligned with the rotational direction S1. The tensile element 200 is also wound off the coupling wheel 18 of the second detent fitting 13 over a travel path. By actuating the actuating shaft 15, the control cam 126 for unlocking the locking bars 123 is moved and the second detent fitting 13 is thus unlocked.

When actuating the actuating device 16 for unlocking the detent fittings 12, 13 the tensile element 200 in the form of the tensile cable is therefore wound to a certain extent onto the coupling wheel 17 of the first detent fitting 12 and at the same time wound to a certain extent off the coupling wheel 18 of the second detent fitting 13. An actuation of the first detent fitting 12 via the actuating device 16 thus also leads to a synchronous common actuation of the second detent fitting 13, so that the detent fittings 12, 13 are unlocked together and the backrest frame 11 is thus released for pivoting relative to the seat frame 10.

As visible from FIG. 2 in combination with FIG. 3B, the tensile element 200 runs from the top into the guide groove 170 of the coupling wheel 17 of the first detent fitting 12 and extends upwardly from the bottom out of the guide groove 180 of the coupling wheel 18 of the second detent fitting 13.

If, after unlocking the detent fittings 12, 13, the backrest frame 11 is pivoted to the front in a pivoting direction R in order [to move] the backrest frame 11 into a position pivoted to the front, for example for providing a so-called easy entry function (for permitting access to a seat to the rear of the vehicle seat) or a fold-flat function (for providing a flat storage surface), it has to be ensured that this pivoting movement of the backrest frame 11 has no influence on the detent fittings 12, 13 and, in particular, does not impair the actuated position of the detent fittings 12, 13.

If the backrest frame 11 is pivoted to the front in the pivoting direction R, due to the support of the Bowden tube 201 via the Bowden tube supports 21, 22 on the backrest frame 11, the cable pull 20 is pivoted therewith to the front so that the position of the cable pull 20 relative to the detent fittings 12, 13 is altered. However, when the backrest frame 11 is pivoted, the coupling elements in the form of the coupling wheels 17, 18 remain fixed in position relative to the seat frame 10 since the control cam 126 operatively connected to the locking bars 123 remains fixed in position relative to the first fitting part 120 of each detent fitting 12, 13 and the first fitting part 120 is fixedly connected to the respectively assigned frame part 100, 101.

Figure 4A:
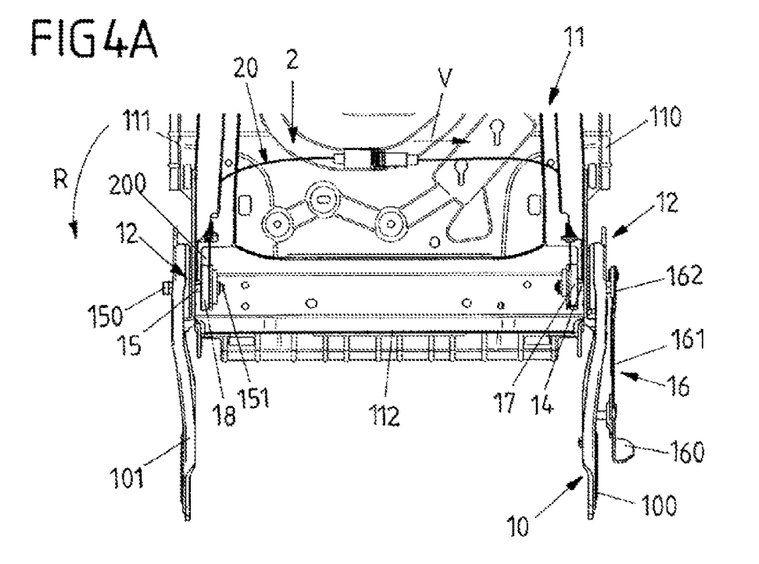
FIG. 4A shows a front view of the vehicle seat frame.
Figure 4B:
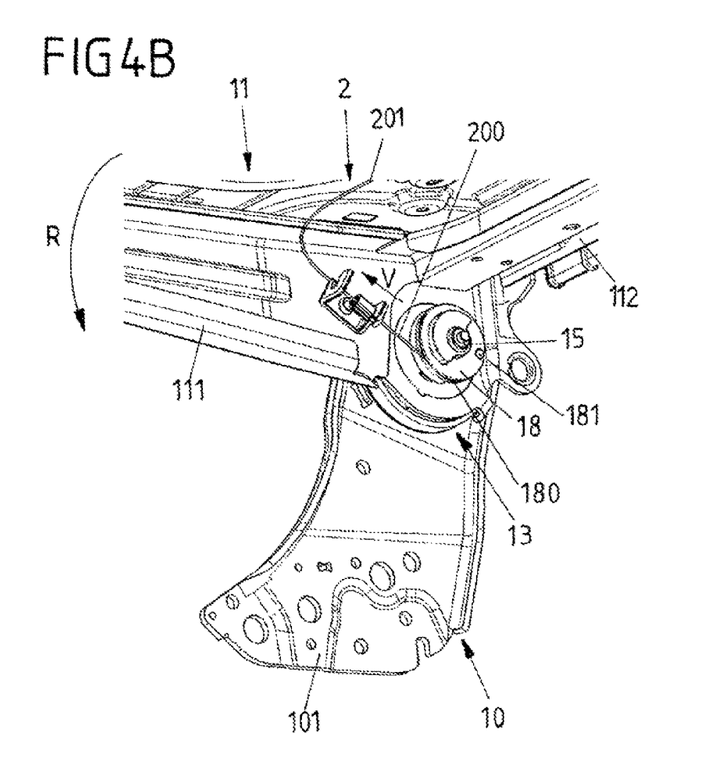
FIG. 4B shows an enlarged view of the second detent fitting on the other side of the vehicle seat frame when pivoting the backrest frame relative to the seat frame.

The pivoting forward of the backrest frame 11, however, has no influence on the actuation of the detent fittings 12, 13. This has the result that, when pivoting forward the backrest frame 11 in the pivoting direction R, the tensile element 200, on the one hand, is wound over a travel path onto the coupling wheel 17 of the first detent fitting 12 and, on the other hand, is wound off the coupling wheel 18 of the second detent fitting 13, caused by the alteration in the position of the backrest frame 11 relative to the coupling wheels 17, 18 which remain fixed in location and position relative to the seat frame 10 (see FIG. 4B for the coupling wheel 18).

As a result, the tensile element 200 in the form of the tensile cable is displaced in the displacement direction V inside the Bowden tube 201 on the backrest frame 11 but without a force being exerted thereby on one of the coupling wheels 17, 18. The extended length of the tensile element 200 between the coupling wheels 17, 18 does not alter.

The coupling device 2 serves to couple together the detent fittings 12, 13 for a common actuation. In this case it may be provided that the coupling device 2 provides a 1:1 ratio, i.e. an actuation movement on the first detent fitting 12 is transmitted in a uniform manner to the second detent fitting 13.

It is, however, conceivable and possible by means of the coupling device 2 to provide a step-up or step-down gearing which transmits an actuating movement in a step-up or step-down manner from the first detent fitting 12 to the second detent fitting 13.

Figure 5:
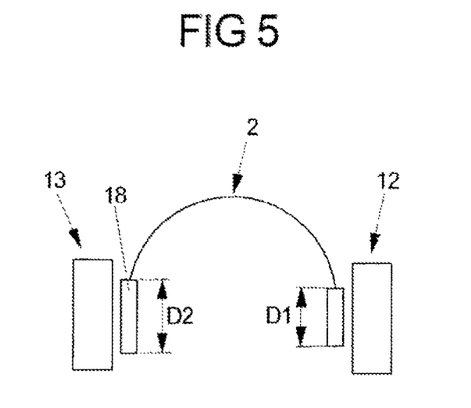
FIG. 5 shows a schematic view of the detent fittings with coupling elements of different diameters.

To this end, the coupling wheels 17, 18 may be configured with different diameters D1, D2, as shown schematically in FIG. 5. By adapting and matching the diameters D1, D2 to one another (slight) step-up or step-down gearings may be provided which, for example, may be used for compensating tolerances.

The idea underlying the invention is not limited to the exemplary embodiments disclosed above but, in principle, may also be implemented in a completely different manner in other embodiments.

In principle, for example, more than two detent fittings may also be provided on a vehicle seat, for example a rear seat arrangement or the like, said detent fittings being coupled together via one or more coupling devices.

By using a coupling device with a tensile element transmitting tensile forces, for example a tensile cable, a band, a strap, a chain or the like, a seat arrangement may be provided in which, in particular, constructional space for a conventionally provided actuating shaft for coupling a plurality of detent fittings may be dispensed with.

By using a tensile element transmitting tensile forces, a detent fitting arrangement may be provided as a prefabricated sub-assembly with low tolerances, a low constructional space requirement and a reduced number of individual parts to be mounted. In particular, a detent fitting arrangement may be mounted as a prefabricated sub-assembly on a vehicle seat without a coupling device having to be retrospectively attached and, in particular, without an actuating shaft—as conventionally required—having to be passed through the detent fittings.

LIST OF REFERENCE NUMERALS

1 Vehicle seat frame
10 Seat frame
100, 101 Frame part
11 Backrest frame
110,111 Frame part
112 Transverse part
12, 13 Detent fitting
120 First fitting part
121 Second fitting part
122 Retaining ring
123 Bar element
124 Toothing
125 Toothing
126 Control cam
127 Spring
128 Slotted guide
129 Lug
14, 15 Actuating shaft
140, 141, 150, 151 End
142 Recess
16 Actuating device
160 Actuating lever
161 Lever
162 Pivoting lever
17, 18 Coupling element (coupling wheel)
170, 180 Guide groove
171, 181 Nipple chamber
2 Coupling device
20 Cable pull 200 Tensile cable
201 Bowden tube
21, 22 Bowden tube support
23 Length compensation device
A Rotational axis
D Axis
B1, B2 Actuating direction
D1, D2 Diameter
R Pivoting direction
S1, S2 Pivoting direction
V Displacement direction

The invention claimed is:

1. A vehicle seat frame comprising
    a first adjusting part and a second adjusting part which is pivotable relative to the first adjusting part,
    at least two detent fittings by means of which the first adjusting part and the second adjusting part are connected together, wherein the at least two detent fittings hold the two adjusting parts in position relative to each other in a locked state and are able to be unlocked from each other in order to pivot the two adjusting parts,
    an actuating device which is connected to a first of the at least two detent fittings for unlocking the first of the at least two detent fittings and
    a coupling device by means of which the at least two detent fittings are coupled together for a common unlocking process,
    wherein the coupling device comprises a tensile element which is designed to transmit a tensile force and which is designed to transmit a tensile force from the first of the at least two detent fittings to the second of the at least two detent fittings in order to unlock the second of the at least two detent fittings when actuating the actuating device in order to unlock the first of the at least two detent fittings;
    wherein the first of the at least two detent fittings and the second of the at least two detent fittings in each case comprise a coupling element which is rotatable about a rotational axis, the tensile element acting thereon and being rotatable for unlocking the first and the second of the at least two detent fittings; and
    wherein the coupling element is configured as a coupling wheel with a circumferential surface extending around the rotational axis, the tensile element being guided thereon.

2. The vehicle seat frame as claimed in claim 1, wherein the tensile element is configured as a tensile cable.

3. The vehicle seat frame as claimed in claim 1, wherein the tensile element is guided on the second adjusting part through a guide device.

4. The vehicle seat frame as claimed in claim 1, wherein the tensile element is at least partially guided in a Bowden tube supported on the second adjusting part.

5. The vehicle seat frame as claimed in claim 1, wherein the first of the at least two detent fittings and the second of the at least two detent fittings in each case comprise an actuating shaft which is rotatable about the rotational axis, the coupling element of the assigned detent fitting being arranged thereon.

6. The vehicle seat frame as claimed in claim 1, wherein the coupling wheel of the first of the at least two detent fittings and the coupling wheel of the second of the at least two detent fittings differ in their diameter.

7. The vehicle seat frame as claimed in claim 1, wherein the tensile element is guided on a guide groove of the coupling wheel.

8. A vehicle seat frame comprising:
    a first adjusting part and a second adjusting part which is pivotable relative to the first adjusting part,
    at least two detent fittings by means of which the first adjusting part and the second adjusting part are connected together, wherein the at least two detent fittings hold the two adjusting parts in position relative to each other in a locked state and are able to be unlocked from each other in order to pivot the two adjusting parts,
    an actuating device which is connected to a first of the at least two detent fittings for unlocking the first of the at least two detent fittings and
    a coupling device by means of which the at least two detent fittings are coupled together for a common unlocking process,
    wherein the coupling device comprises a tensile element which is designed to transmit a tensile force and which is designed to transmit a tensile force from the first of the at least two detent fittings to the second of the at least two detent fittings in order to unlock the second of the at least two detent fittings when actuating the actuating device in order to unlock the first of the at least two detent fittings;
    wherein the first of the at least two detent fittings and the second of the at least two detent fittings in each case comprise a coupling element which is rotatable about a rotational axis, the tensile element acting thereon and being rotatable for unlocking the first and the second of the at least two detent fittings; and
    wherein when actuating the actuating device for unlocking the first of the at least two detent fittings the tensile element is wound onto the coupling element of the first of the at least two detent fittings and is wound off the coupling element of the second of the at least two detent fittings.

9. The vehicle seat frame as claimed in claim 1, wherein when pivoting the second adjusting part relative to the first adjusting part, after unlocking the at least two detent fittings, the coupling element of the first of the at least two detent fittings and the coupling element of the second of the at least two detent fittings are fixed in position relative to the first adjusting part.

10. A vehicle seat frame comprising:
    a first adjusting part and a second adjusting part which is pivotable relative to the first adjusting part,
    at least two detent fittings by means of which the first adjusting part and the second adjusting part are connected together, wherein the at least two detent fittings hold the two adjusting parts in position relative to each other in a locked state and are able to be unlocked from each other in order to pivot the two adjusting parts,
    an actuating device which is connected to a first of the at least two detent fittings for unlocking the first of the at least two detent fittings and
    a coupling device by means of which the at least two detent fittings are coupled together for a common unlocking process,
    wherein the coupling device comprises a tensile element which is designed to transmit a tensile force and which is designed to transmit a tensile force from the first of the at least two detent fittings to the second of the at least two detent fittings in order to unlock the second of the at least two detent fittings when actuating the actuating device in order to unlock the first of the at least two detent fittings;
    wherein the first of the at least two detent fittings and the second of the at least two detent fittings in each case comprise a coupling element which is rotatable about a rotational axis, the tensile element acting thereon and being rotatable for unlocking the first and the second of the at least two detent fittings;

wherein when pivoting the second adjusting part relative to the first adjusting part, after unlocking the at least two detent fittings, the coupling element of the first of the at least two detent fittings and the coupling element of the second of the at least two detent fittings are fixed in position relative to the first adjusting part; and wherein when pivoting the second adjusting part relative to the first adjusting part the tensile element is wound onto the one coupling element and is wound off the other coupling element.

11. The vehicle seat frame as claimed in claim 9, wherein when pivoting the second adjusting part relative to the first adjusting part, after unlocking the at least two detent fittings, the tensile element is displaced relative to a guide device, the tensile element being guided thereby on the second adjusting part.

12. The vehicle seat frame as claimed in claim 1, wherein the actuating device is configured as a lever kinematic system.

13. The vehicle seat frame as claimed in claim 1, wherein the at least two detent fittings in each case comprise a first fitting part connected to the first adjusting part and a second fitting part connected to the second adjusting part and rotatably mounted on the first fitting part, wherein the first fitting part comprises at least one bar element which is mounted on the first fitting part, and the second fitting part comprises a toothing, the at least one bar element in the locked state being in engagement therewith in a locking manner.

* * * * *